United States Patent
Park et al.

(10) Patent No.: US 9,535,561 B2
(45) Date of Patent: Jan. 3, 2017

(54) METHOD FOR CONTROLLING CONTENT-SHARING, AND PORTABLE TERMINAL AND CONTENT-SHARING SYSTEM USING SAME

(75) Inventors: Sunju Park, Seoul (KR); Jongmin Yun, Seoul (KR); Yeonjoo Joo, Seoul (KR); Heeyeon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 238 days.

(21) Appl. No.: 13/811,879

(22) PCT Filed: Aug. 24, 2011

(86) PCT No.: PCT/KR2011/006239
§ 371 (c)(1),
(2), (4) Date: Jan. 23, 2013

(87) PCT Pub. No.: WO2012/026750
PCT Pub. Date: Mar. 1, 2012

(65) Prior Publication Data
US 2013/0125018 A1    May 16, 2013

(30) Foreign Application Priority Data

Aug. 24, 2010 (KR) .................. 10-2010-0081914
Aug. 24, 2010 (KR) .................. 10-2010-0081924
Aug. 24, 2010 (KR) .................. 10-2010-0081927

(51) Int. Cl.
*G06F 3/00* (2006.01)
*G06F 3/048* (2013.01)
(Continued)

(52) U.S. Cl.
CPC ............ *G06F 3/048* (2013.01); *G06Q 10/00* (2013.01); *G06F 3/1454* (2013.01); *G09G 2370/16* (2013.01)

(58) Field of Classification Search
CPC ... H04N 5/232; H04N 7/17309; G06F 3/1454; G06F 17/30781
See application file for complete search history.

(56) References Cited

U.S. PATENT DOCUMENTS

| 7,817,143 B2 | 10/2010 | Soh et al. | |
| 8,233,090 B2 * | 7/2012 | Chun ............. | H04H 60/80 348/552 |

(Continued)

FOREIGN PATENT DOCUMENTS

| CN | 1666169 A | 9/2005 |
| CN | 101616213 A | 12/2009 |

(Continued)

OTHER PUBLICATIONS

Collomb et al., "Extending drag-and-drop to new interactive environments: A multi-display, multi-instrument and multi-user approach," Interacting with Computers, vol. 20, No. 6, Dec. 1, 2008, pp. 562-573, XP025693120.

*Primary Examiner* — Ariel Mercado
(74) *Attorney, Agent, or Firm* — Birch, Stewart, Kolasch & Birch, LLP

(57) ABSTRACT

The present invention relates to a method for controlling content-sharing among a plurality of content-providing devices. The method includes: receiving information on a content from a first content playback device and displaying images corresponding to the content; storing the received content information; and transmitting the stored content information to a second content playback device and ending the displaying of the images corresponding to the content.

15 Claims, 17 Drawing Sheets

(51) Int. Cl.
    *G06F 17/00*    (2006.01)
    *G06Q 10/00*    (2012.01)
    *G06F 3/14*    (2006.01)

(56) References Cited

U.S. PATENT DOCUMENTS

| | | |
|---|---|---|
| 2005/0144344 A1 | 6/2005 | Koyata et al. |
| 2006/0152497 A1 | 7/2006 | Rekimoto |
| 2006/0253866 A1* | 11/2006 | Curcio .................. G08C 17/02 348/E7.069 |
| 2007/0129046 A1 | 6/2007 | Soh et al. |
| 2007/0147679 A1 | 6/2007 | You |
| 2007/0288970 A1 | 12/2007 | Tedenvall |
| 2008/0120241 A1 | 5/2008 | Kim |
| 2008/0133715 A1 | 6/2008 | Yoneda et al. |
| 2009/0309846 A1 | 12/2009 | Trachtenberg et al. |
| 2009/0322498 A1 | 12/2009 | Yun et al. |
| 2009/0325645 A1 | 12/2009 | Bang et al. |
| 2010/0064228 A1* | 3/2010 | Tsern .............................. 715/740 |
| 2010/0257471 A1* | 10/2010 | Ang et al. ..................... 715/769 |
| 2011/0163944 A1* | 7/2011 | Bilbrey et al. ................ 715/863 |
| 2012/0030587 A1* | 2/2012 | Ketkar ............. G06F 17/30038 715/751 |

FOREIGN PATENT DOCUMENTS

| | | |
|---|---|---|
| CN | 101616214 A | 12/2009 |
| EP | 1 796 389 A2 | 6/2007 |
| JP | 2005-190523 A | 7/2005 |
| JP | 2008-139423 A | 6/2008 |
| JP | 2008-204397 A | 9/2008 |
| KR | 10-2004-0077233 A | 9/2004 |
| KR | 10-2007-0047064 A | 5/2007 |
| KR | 10-2007-0063981 A | 6/2007 |
| KR | 10-2008-0044481 A | 5/2008 |
| KR | 10-2009-0010527 A | 1/2009 |
| WO | WO 2010/068741 A1 | 6/2010 |

* cited by examiner

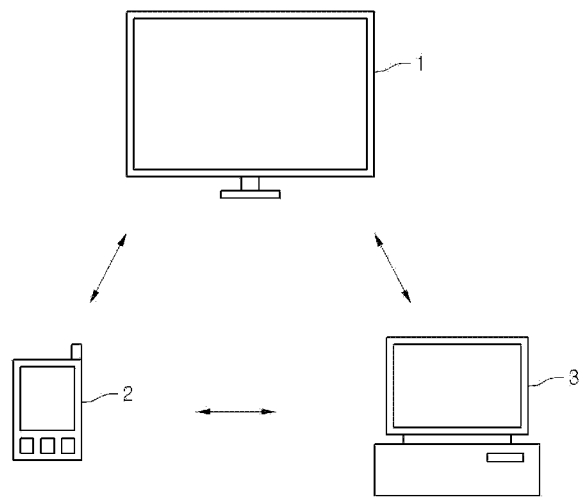
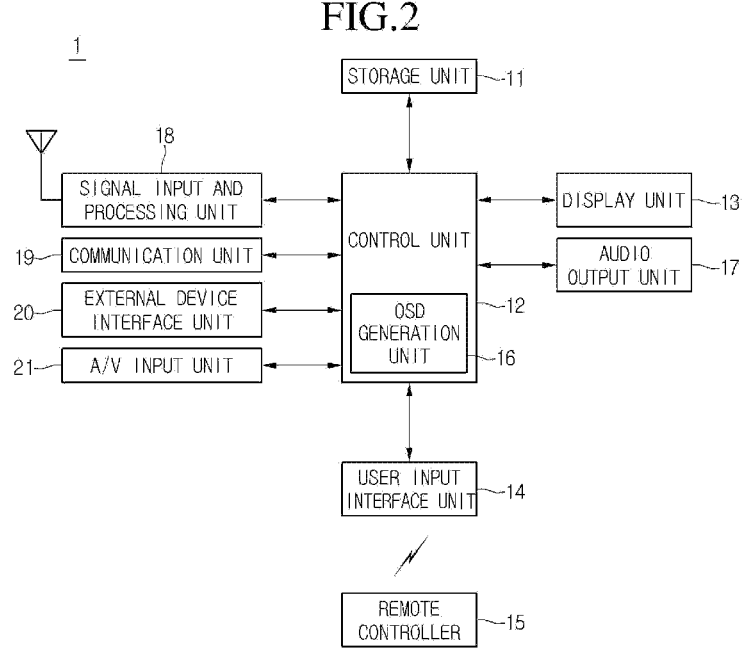

(a)    (b)

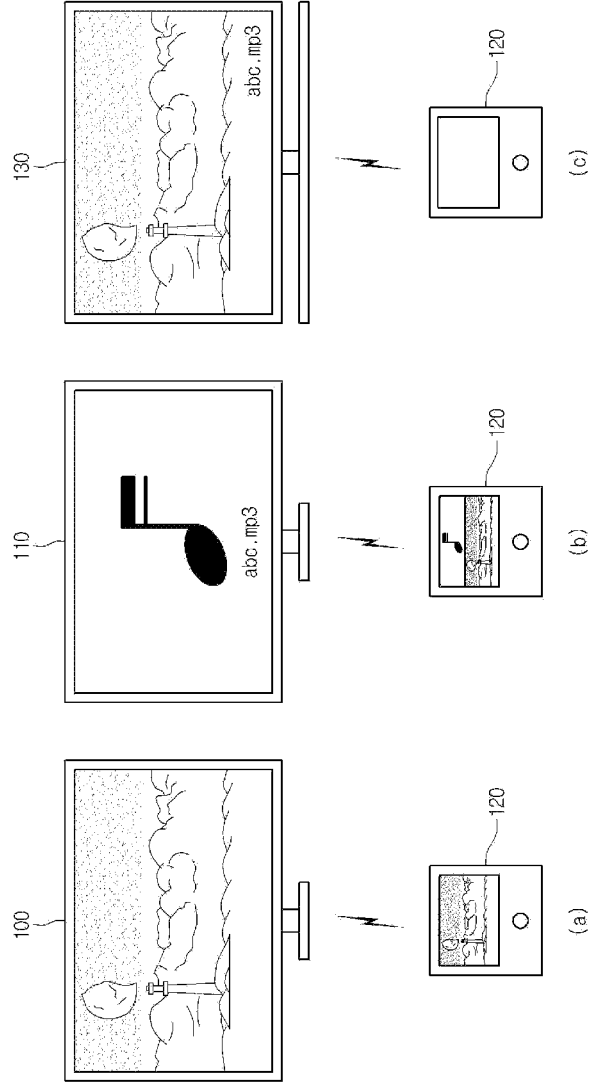

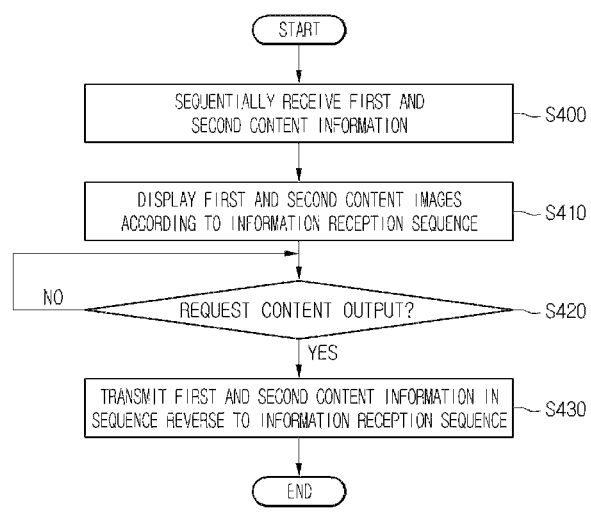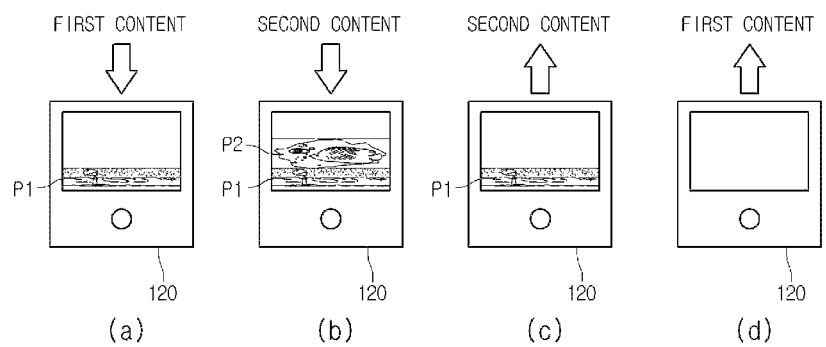

METHOD FOR CONTROLLING CONTENT-SHARING, AND PORTABLE TERMINAL AND CONTENT-SHARING SYSTEM USING SAME

This application is the National Phase of PCT/KR2011/006239 filed on Aug. 24, 2011 which claims priority under 35 U.S.C. 119(a) to Patent Application Nos. 10-2010-0081914 filed on Aug. 24, 2010 in the Republic of Korea, 10-2010-0081924 filed on Aug. 24, 2010 in the Republic of Korea and 10-2010-0081927 filed on Aug. 24, 2010 in the Republic of Korea, all are hereby expressly incorporated by reference into the present application.

TECHNICAL FIELD

The present invention relates to a method for sharing a content among a plurality of content playback devices.

BACKGROUND ART

Recently, a digital television service using a wired and wireless communication network has been generalized. The digital TV service may provide various services that could not be provided in an existing analog broadcasting service.

For example, an internet protocol television (IPTV) service, which is a kind of digital TV services, provides bi-directionality allowing a user to actively select a kind of viewing programs, a viewing time thereof, or the like. The IPTV service may also provide various services, such as the Internet search, a home shopping, an online game, and the like, based on this bi-directionality.

DISCLOSURE

Technical Problem

An object of the present invention is to provide a method for efficiently controlling content-sharing among a plurality of content playback devices.

Technical Solution

According to an exemplary embodiment of the present invention, there is provided a method for controlling content-sharing between content playback devices, the method including: receiving information on a content from a first content playback device and displaying images corresponding to the content; storing the received content information; and transmitting the stored content information to a second content playback device and ending the displaying of the images corresponding to the content.

According to another exemplary embodiment of the present invention, there is provided a portable terminal including: a user input unit requested to input a content reproduced or stored in a first content playback device and output the content to a second content playback device from a user; a communication unit receiving information on the content from the first content playback device and transmitting the received content information to the second content playback device; and a display unit displaying images corresponding to the content using the received information at the time of a user's content input request and ending the displaying of the images at the time of a user's content output request.

According to still another exemplary embodiment of the present invention, there is provided a content playback device including: a display unit reproducing a content; and a communication unit transmitting information on the reproduced content to the portable terminal, corresponding to a content input request received from the portable terminal, wherein the display unit displays images of the reproduced content so as to gradually disappear according to the input request.

According to still another embodiment of the present invention, there is provided a content playback device, the content playback device including: a communication unit receiving information on a content from a portable terminal; and a display unit displaying images corresponding to the content so as to gradually appear, wherein the communication unit receives data including the content form a transmitting side content playback device using the received content information.

According to still another embodiment of the present invention, there is provided a content-sharing system, the content-sharing system including: a first content playback device reproducing a content; a second content playback device receiving content data from the first content playback device to reproduce the content; and a portable terminal controlling the first and second content playback devices, wherein at the time of a user' content input request using the portable terminal, images corresponding to the content are displayed so as to gradually appear on a screen of the portable terminal simultaneously with gradually disappearing on a screen of the first content playback device, and at the time of a user's content output request using the portable terminal, the images corresponding to the content are displayed so as to gradually appear on a screen in the second content playback device simultaneously with gradually disappearing on the screen of the portable terminal.

According to still another embodiment of the present invention, there is provided a method for controlling content-sharing, the method including: receiving information on a first content from a first content playback device and displaying images corresponding to the first content; receiving information on a second content from a second content playback device and displaying images corresponding to the second content together with the first content images; storing the received first and second content information; and transmitting the stored first and second content information to the second content playback device and ending the displaying of the first and second content images.

According to still another embodiment of the present invention, there is provided a portable terminal, the portable terminal including: a user input unit requested to input a first content reproduced or stored in a first content playback device, to input a second content reproduced or stored in a second content playback device, and to output the first and second contents to the second content playback device, by a user; a communication unit receiving information on the first and second contents from each of the first and second content playback devices and transmitting the received first and second content information to the second content playback device; and a display unit simultaneously displaying images corresponding to the first content and images corresponding to the second content according to the user's content input request and ending the displaying of the first and second content images according to the output request.

According to still another embodiment of the present invention, there is provided a content-sharing system, the content-sharing system including: a first content playback device reproducing a first content; a second content playback device reproducing a second content; a third content playback device receiving content data from each of the first and second content playback devices to reproduce the first and second contents; and a portable terminal controlling the content playback devices, wherein at the time of a user' input request for the first content using the portable terminal, images corresponding to the first content are displayed so as to gradually appear on a screen of the portable terminal, at the time of a user's input request for the second content using the portable terminal, images corresponding to the second content gradually appear to be displayed together with the first content images on a screen of the portable terminal, and at the time of a user's content output request using the portable terminal, the first and second images are displayed so as to gradually appear on a screen of the third content playback device simultaneously with gradually disappearing on the screen of the portable terminal.

According to still another embodiment of the present invention, there is a method for controlling content-sharing between content playback devices, the method including: sequentially receiving information on each of first and second contents; disposing images corresponding to each of the first and second contents according to a content information reception sequence to simultaneously display the images; and transmitting the first and second content information in a sequence reverse to the content information reception sequence, corresponding to a content output request.

According to still another embodiment of the present invention, there is a portable terminal, the portable terminal including: a user input unit requested to input and output a plurality of contents by a user; a communication unit sequentially receiving and transmitting information on the plurality of contents; and a display unit disposing a plurality of content images corresponding to the plurality of contents according to a content information reception sequence to simultaneously display the plurality of images, according to the user's input request, wherein the communication unit transmits information on each of the plurality of contents in a sequence reverse to the content information reception according to the user's output request, and the plurality of displayed content images sequentially disappear according to an information transmission sequence.

The portable terminal may be a remote controller for controlling operations of content playback devices.

Meanwhile, the method for controlling content-sharing may be implemented by a computer readable recoding medium having a program recorded therein, the program executing the method in the computer.

Advantageous Effects

As set forth above, according to the exemplary embodiments of the present invention, the content is shared between the plurality of content playback devices, thereby making it possible to freely reproduce the user desired content regardless of a space or a time.

In addition, the content images shared with the portable terminal is displayed so as to gradually appear or disappear using the visual effect similar to that of the pipette, thereby making it possible to intuitively transfer the information on the content and movement of the content to the user. Therefore, user's control operations are effectively induced, thereby making it possible to improve convenience.

Meanwhile, two or more contents are input from the plurality of content playback devices to be reproduced in one content playback device, thereby making it possible to simultaneously reproduce various contents.

In addition, the plurality of contents images corresponding to the plurality of contents input from the plurality of content playback devices are displayed in the portable terminal, thereby making it possible to easily transfer the information on various contents to the user.

DESCRIPTION OF DRAWINGS

FIG. 1 is a diagram showing a simple configuration of a system for content-sharing;

FIG. 2 is a block diagram showing a first exemplary embodiment of a configuration of a content playback device;

FIGS. 15 to 18 are diagrams showing exemplary embodiments of the method for sharing content among content playback devices according to the method for controlling content-sharing shown in FIG. 14;

FIG. 19 is a flow chart showing a third exemplary embodiment of the method for controlling content-sharing according to the present invention;

FIGS. 20 to 26 are diagrams showing exemplary embodiments of a method for displaying information on a plurality of contents stored in a portable terminal.

BEST MODE

Figure 3:
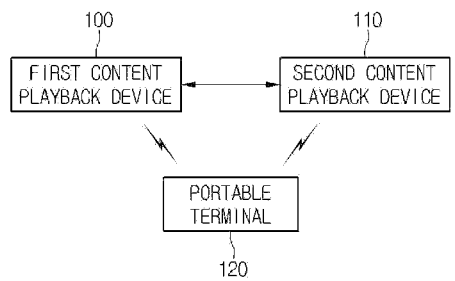
FIG. 3 is a block diagram showing the configuration of the content-sharing system according to the first exemplary embodiment of the present invention.

Hereinafter, a method for controlling content-sharing according to the exemplary embodiment of the present invention, a portable terminal using the same, a content playback device and system will be described in detail with reference to accompanying drawings.

FIG. 1 shows a simple configuration of a system for content-sharing. The content-sharing system may be configured to include a plurality of content playback devices 1 to 3.

The plurality of content playback devices 1 to 3 may be connected to each other using a wired and wireless network such as a local wireless communication or internet to transmit and receive data, thereby making it possible to share the same content with each other and reproduce the same content.

Therefore, a user may receive a desired content without being interrupted regardless of a time or a space, using any one of the plurality of content playback devices 1 to 3.

Referring to FIG. 1, a first content playback device 1 may be a display device such as a TV, or the like. More specifically, the first content playback device 1 may be a digital TV such as a network TV, a hybrid broadcast broadband TV (HBBTV). a smart TV, or the like, capable of providing various types of content services such as a real time broadcasting, a contents on demand (COD), a game, news, video communication, and the like, using the internet network.

Meanwhile, the second content playback device may be a portable terminal such as a mobile phone, or the like, and the third content playback device may be a personal computer (PC) such as a desktop computer, or the like.

However, the plurality of content playback devices 1 to 3 are not limited to the above-mentioned TV, portable terminal, and PC, but may be various devices capable of being connected to the wired and wireless network to transmit and receive data with other content playback device and reproducing a content.

For example, the content-sharing system according to the exemplary embodiment of the present invention may be configured to include various devices capable of outputting images or audio, such as a TV, a smart phone, a notebook computer, the desktop computer, a tablet PC, a digital broadcasting terminal, a personal digital assistants (PDA), a portable multimedia player (PMP), an internet phone such as a service over IP (SoIP), or the like, a navigation, an audio outputting device such as MP3 player, or the like.

In addition, the number of content playback devices configuring the content-sharing system is not limited but may be extended.

In addition, the content may be various types such as the real time broadcasting, a cinema, a music, a photograph, a document file, contents on demand (COD), a game, news, a video telephone, an application, and the like.

Meanwhile, since a communication scheme between the plurality of content playback devices 1 to 3 for content-sharing as described above may use various wired and wireless networks in which data communication may be performed, the communication scheme is not limited to a specific communication scheme.

For example, the first content playback device 1 may directly transmit data including content to be shared to the second content playback device 2 or transmit the data to the second content playback device 2 through an external device such as a server (not shown), or the like, which may be determined by the communication scheme of the wired and wireless network connected between the first and second content playback devices 1 and 2.

As an example, the plurality of content playback devices 1 to 3 may be connected to each other using the local wireless communication system such as a wireless HD (WiHD), a wireless home digital interface (WHDi), a wireless LAN (WiFi), a ZigBee, a binary code division multiple access (CDMA), or the like to transmit and receive content data therebetween.

As another example, the plurality content playback devices 1 to 3 may be connected to a server (not shown) using a home network to transmit and receive the content data to be shared through the server.

The server (not shown) may be implemented by a separated device or be provided in or connected to any one of the plurality of content playback devices 1 to 3. For example, a set-top box (STB) connected to the TV among the plurality of content playback devices 1 to 3 may serve as the server.

More specifically, the server may be implemented in a form of an IPTV set-top box, wherein the IPIV set-top box may have software therein in order to support the bidirectional service to serve as a service client based on the software.

For example, the IPTV set-top box may request a service provider to transmit a broadcasting content and convert broadcasting signals received from the service provider into reference TV signals to transmit the converted reference TV signals to the TV while transmitting and receiving information to and from the service provider through the IP network In this case, at least one of the plurality of content playback devices 1 to 3 is connected to the IPTV set-top box, such that a plurality of content playback devices 1 to 3 may transmit and receive the content data therebetween.

Hereinafter, the case in which any one of the plurality of content playback devices 1 to 3 transmit data to other content playback device includes the case in which two content playback devices transmit and receive data through the external device such as the above-mentioned server, or the like, as well as the case in which they directly transmit and receive data therebetween.

FIG. 2 is a block diagram showing an exemplary embodiment of a configuration of a content reproducing device.

Referring to FIG. 2, the content playback device 1 may include a signal input and processing unit 18, an external device interface unit 20, a communication unit 19, an A/V input unit 21, a storage unit 11, a user input interface unit 14, a control unit 12, a display unit 13, and audio output unit 17.

The signal input and processing unit 18 selects a radio frequency (RF) broadcasting signal corresponding to a channel selected by a user or all of the channels stored in advance among RF broadcasting signals. In addition, the signal input and processing unit 18 converts the selected RF broadcasting signal into an intermediate frequency signal, a base band image, or a voice signal.

The external device interface unit 20 may connect an external device and the content playback device 1 to each other. For example, it may be connected by a wire/wireless to an external device such as a digital versatile disk (DVD), a blue ray, a game machine, a camera, a camcorder, a computer (a notebook), or the like.

The communication unit 19 may provide an interface for connecting the content playback device 1 to a wired and wireless network such as the internet, or the like. To this end, the communication unit 19 may include an Ethernet terminal, and a wireless LAN (WLAN), a wireless broadband (Wibro), a world interoperability for microwave access (Wimax), a high speed downlink packet access (HSDPA) communication standard, or the like, may be used in order to access to the wireless network.

Meanwhile, the communication unit 19 may access a predetermined web page through the wired and wireless network. That is, the communication unit 19 may access the predetermined web page through the network to transmit or receive data to or from a corresponding server. In addition, the communication unit 19 may receive a content or data provided from a content provider or a network operator. That is, the communication unit 19 may receive the content such as a cinema, an advertisement, a game, a VOD, broadcasting signals, and the like, and information associated with the contents provided from the contents provider and the network provider. In addition, the communication unit 19 may receive update information and a data file of a firmware provided by the network operator.

Further, the communication unit 19 may transmit data to the internet, the content provider, or the network operator.

According to the exemplary embodiment of the present invention, the communication unit 19 may transmit the content data to be shared to other content playback device connected to the wired and wireless network as describe above.

The A/V input unit 21 may include a USB terminal, a composite video banking sync (CVBS) terminal, a component terminal, an S-video terminal (analog), a digital visual interface (DVI) terminal, a high definition multimedia interface (HDMI) terminal, an RGB terminal, and a D-SUB terminal so as to input video and audio signals of the external device into the content playback device 1.

Meanwhile, the A/V input unit 21 may include a camera, a microphone, or the like, to obtain data corresponding to user's image or voice and transfer the obtained data to the control unit 12.

The storage unit 11 may store a program therein in order to process and control each signal in the control unit 12 or store processed image, voice, or data signals therein. Meanwhile, the storage unit 11 may include at least one storage medium among a flash memory type storage medium, a hard disk type storage medium, a multimedia card type storage medium, a card type memory (for example, an SD memory, an XD memory, or the like), a random access memory (RAM), and a read only memory (ROM) (EEROM etc.). Meanwhile, the content playback device 1 may reproduce the content stored in the storage unit 12 to provide the reproduced content to the user.

The user input interface unit 14 transmits a signal input by the user to the control unit 12 or transmits a signal from the control unit 12 to the user.

For example, the user input interface unit 14 may receive the user input signals or control signals such as a power on/off signal, a channel selection signal, a screen setting signal, and the like from a remote controller 15 to process the signals or receive the control signal from the control unit 12 to transmit the received control signal to the remote controller 15 in various communication schemes such as a Bluetooth communication scheme, a radio frequency identification (RFID) communication scheme, an infrared data association (IrDA) communication scheme, an ultra wideband (UWD) communication scheme, a ZigBee communication scheme, a digital living network alliance communication scheme, and the like.

Meanwhile, the communication unit 19 may perform the same roles as those of the user input interface unit 14 as described above, and in this case, the remote controller 15 is connected to the communication unit 19 using the wired and wireless network, thereby making it possible to transmit and receive the control signal.

The control unit 12 may de-multiplex a data stream input through the signal input and processing unit 18, the communication unit 19 or the external device interface unit 20, or process the de-multiplexed signals, thereby generating and outputting signals for outputting images or voices.

In addition, an on-screen display (OSD) generation unit 16 generates an OSD signal according to the user input or on its own. For example, the OSD generation unit 16 may generate a signal for displaying various information in a graphic form or a text form on a screen of a display unit 13 based on the user input signal or the control signal. The generated OSD signal may include various data such as a user interface screen of the content playback device 1, various menu displays, a widget, an icon, and the like.

Meanwhile, the control unit 12 may control the display unit 13 so as to display the images.

For example, the control unit 12 may control the display unit 13 so that the display unit 13 displays broadcasting images input through the signal input and processing unit 18, external input images input through the external device interface unit 20, images input through a network interface unit, or images stored in the storage unit 11. In this case, the images displayed on the display unit 13 may be still pictures or the moving pictures and be two-dimensional (2D) images or 3D images.

The display unit 13 converts the image signal, the data signal, and the OSD signal that are processed in the control unit 12 and the image signal and data signal that are received in the external device interface 20 to an R signal, a G signal, and a B signal respectively, thereby generating driving signal.

The display unit 13 may display the images using various display schemes such as a plasma display panel (PDP), a liquid crystal display (LCD), an organic light emitting display device (OLED), a flexible display, a three dimensional (3D) display, or the like. Meanwhile, the display unit 13 may be configured of a touch screen, such that it may be used as an input device as well as an output device.

The audio output unit 17 receives signals audio-processed in the control unit 12, for example, a stereo signal, a 3.1 channel signal, or a 5.1 channel signal to output voice.

Although the configuration of the content playback device according to the exemplary embodiment of the present invention is described by way of example with reference to FIG. 2, the present invention is not limited thereto. That is, components shown in FIG. 2 may be integrated, added, or omitted according to main functions or specifications of the content playback device.

For example, in the case of a mobile phone, the mobile phone may further include a mobile communication module, a wireless internet module, or a position information module such as a global position system (GPS), in the case of a PC, the PC may further include a keyboard, a mouse, or the like, for user input.

FIG. 3 is a block diagram showing a configuration of the content-sharing system according to the first embodiment of the present invention, wherein the content-sharing system shown in FIG. 3 may include a first content playback device 100, a second content playback device 110, and a portable terminal 120.

Referring to FIG. 3, the first and second content playback devices 100 and 110 may be content playback devices capable of being connected to each other by the wired and wireless network to transmit and receive data as described above and have the configuration as described with reference to FIG. 3.

The portable terminal 120 may be connected to the first and second content playback devices 100 and 110 using the wired and wireless network and transmit and receive the data using the wired and wireless network to control operations of the first and second content playback devices 100 and 110.

According to the exemplary embodiment of the present invention, the portable terminal 120 may control content-sharing between the first and second content playback devices 100 and 110 according to user's request. For example, the portable terminal 120 may control the first and second content playback devices 100 and 110 according to user's content input or output request so that the content reproduced in the first content playback device 100 is continuously reproduced in the second content playback device 110.

More specifically, the user may request to input the content stored or currently reproduced in the first content playback device 100, using the portable terminal. Therefore, the information on the content requested to be input may be transmitted from the first content playback device 100 to the portable terminal 120 to thereby be stored.

Then, the user may request to output the content to the second content playback device 110 using the portable terminal. Therefore, the information of the content request to be output may be transmitted from the portable terminal to the second content play device 110.

Meanwhile, data including the content to be shared may be transmitted from the first content playback device 100 to the second content playback device 110 by the content information transmission and reception between the above-mentioned portable terminal 120 and the first and second content playback devices 100 and 110. Therefore, the content reproduced or stored in the first content playback device 100 may be reproduced in the second content playback device 110.

The content information may include a name, a file name, a kind, a data size or a storage position, or the like, of the content to be shared, that is, the content stored or reproduced in the first content playback device 100.

Further, the content information may include information on the first content playback device 100, for example, identification information such as a name of the first content playback device 100, a kind thereof, an IP address thereof, and the like, and information on the communication scheme capable of being connected.

According to the exemplary embodiment of the present invention, the second content playback device 110 may request the first content playback device 100 to transmit the content to be shared using the content information received from the portable terminal 120, and the first content playback device 100 may transmit the data including the corresponding content to the second content playback device 110, corresponding to the request.

As described above, the first content playback device 100 may directly transmit the content data to the second content playback device 110 through the wired and wireless network using the local wireless communication, or the like, or transmit the content data through the external device such as the server (not shown), or the like.

According to another exemplary embodiment of the present invention, the content information may include content data to be shared. In this case, the portable terminal 120 may receive the content data from the first content playback device 100 and then directly transmit the received content data to the second content playback device 110 according to according to user's content input or output request.

According to still another exemplary embodiment of the present invention, the second content playback device 110 may receive content data to be shared from an external device except for the first content playback device 100 or the portable terminal 120 using the content information received from the portable terminal 120.

For example, content reproduced in the first content playback device 100 may be a real time broadcasting provided from a broadcasting station or be content received from the Internet server, such as a video on demand (VOD), a commercial on demand (COD), a game, news, and the like. In this case, the content information may include a content provider, broadcasting channel information, a uniform resource locator, and the like, as information on a corresponding content.

More specifically, in the case in which the content to be shared, that is, the content reproduced in the first content playback device 100 is a cinema content located at a specific URL, the transmitted and received content information may include the URL, and the second content playback device may access to a server providing the cinema content using the URL of the received content information from the portable terminal 120.

Meanwhile, in order to perform an operation of controlling content-sharing according to user's request as described above, the portable terminal 120 may have a configuration similar to that of the content playback device 1 shown in FIG. 2.

However, the portable terminal 120 according to the present embodiment may be implemented by omitting or adding some components of the configuration shown in FIG. 2, as needed.

According to the exemplary embodiment of the present invention, the portable terminal 120 having the configuration and operation as described above may be implemented in a form of a remote controller for controlling the first and second content playback devices 100 and 110.

Hereinafter, a method for controlling content-sharing according to the exemplary embodiment of the present invention will be described in detail with reference to FIGS. 4 to 29.

Figure 4:
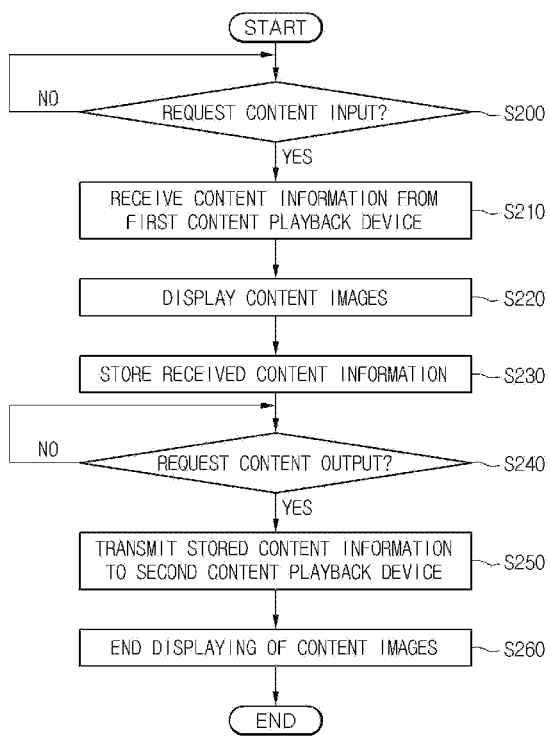
FIG. 4 is a flow chart showing a first exemplary embodiment of a method for controlling content-sharing according to the present invention.
Figure 5:
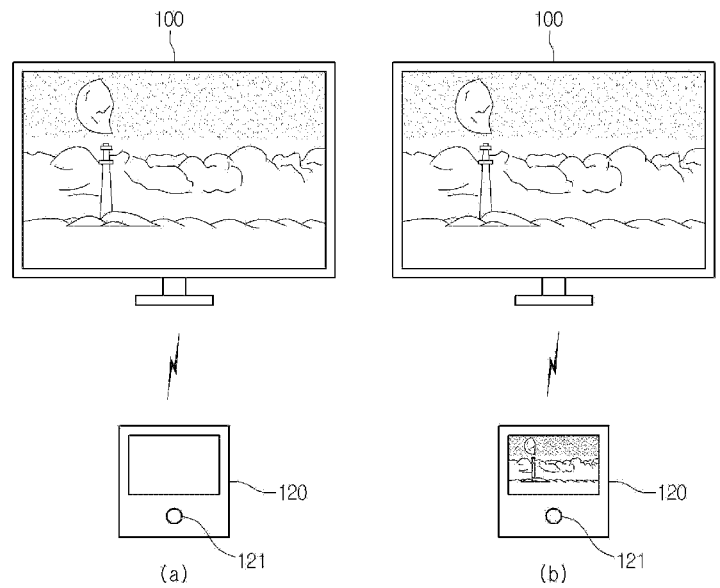
FIGS. 5 to 11 are diagrams showing exemplary embodiments of method for sharing a content among content playback devices according to the method for controlling content-sharing shown in FIG. 4.
Figure 6:
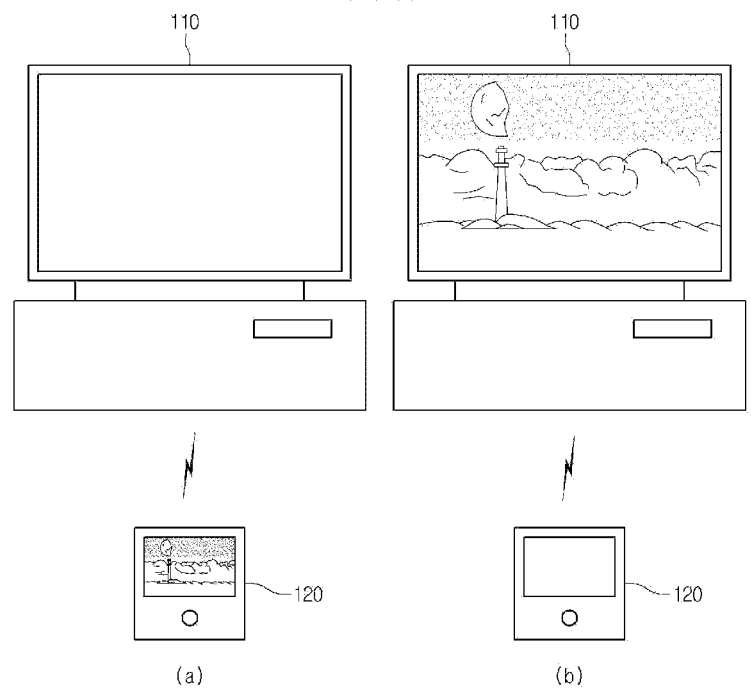
Figure 7:
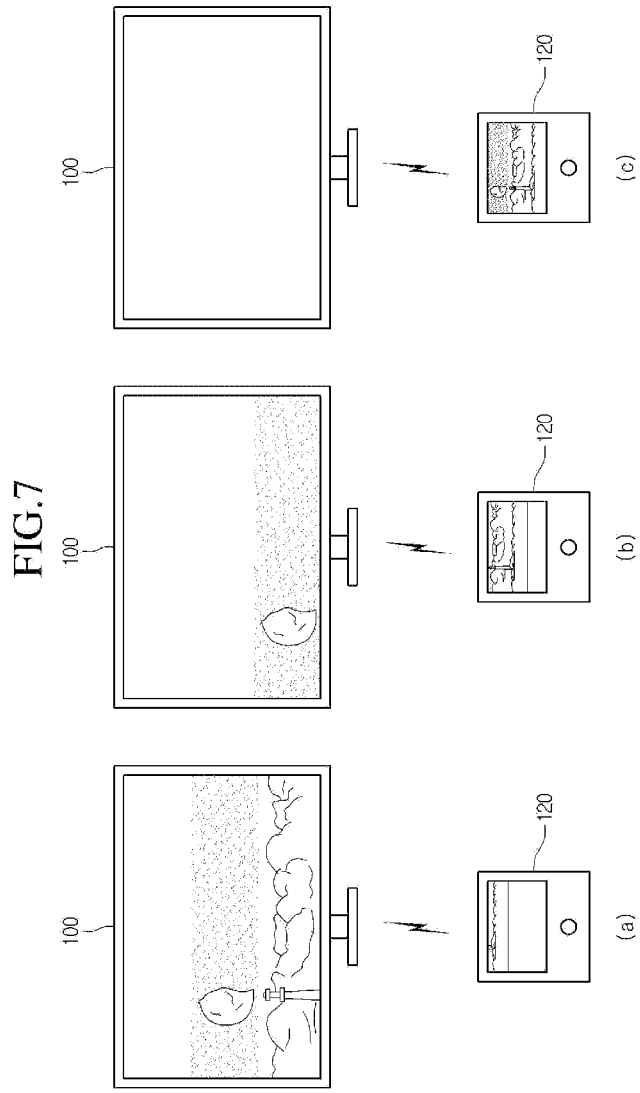
Figure 8:
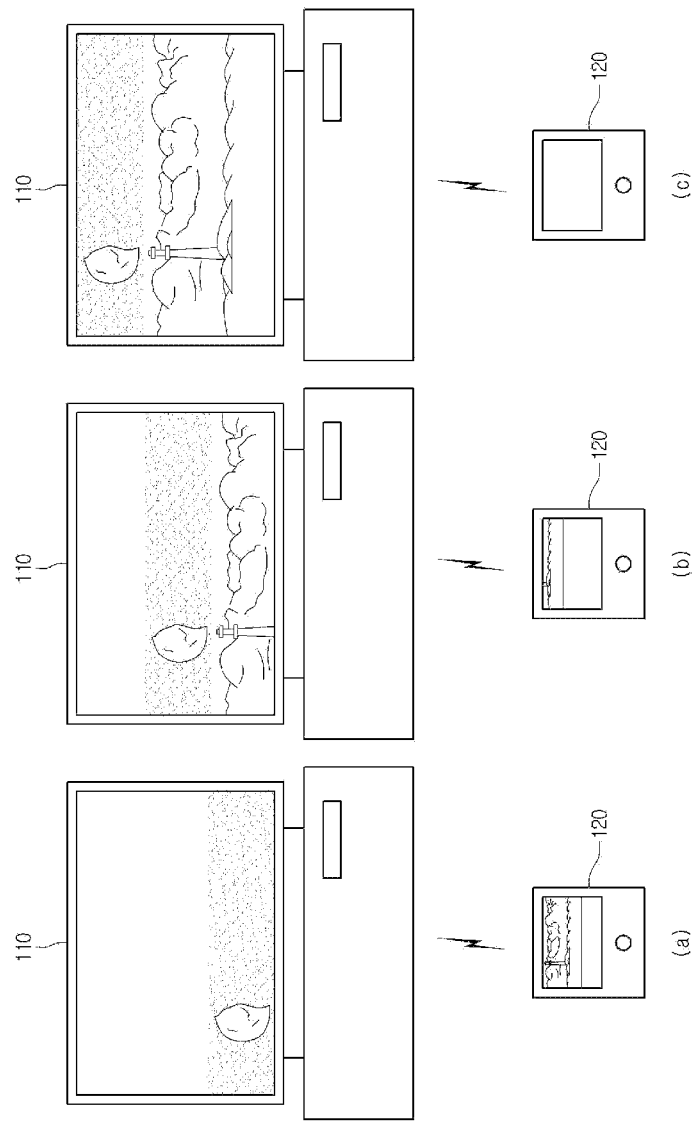

FIG. 4 is a flow chart showing a first exemplary embodiment of a method for controlling content-sharing according to the present invention. The method for controlling content-sharing shown in FIG. 4 will be described with reference to the block diagram shown in FIG. 3. Meanwhile, in the method for controlling content-sharing shown in FIG. 4, a description of portions overlapped with portions described with reference to FIGS. 1 to 3 will be omitted.

Referring to FIG. 4, the portable terminal 120 is requested to input a content reproduced in the first content playback device 100 from the user (S200).

For example, as shown in FIG. 5A, the user may request to input the content reproduced in the first content playback device 100 using a user input unit 121 provided in the portable terminal 120.

More specifically, the user input unit 121 may include at least one button for receiving user's content input or output request, and the user allows the portable terminal 120 to face the first content playback device 100 and then operates the button, thereby making it possible to request input of the content reproduced in the first content playback device 100

The portable terminal 120 receives information from first content playback device 100 on the content currently reproduced therein (S210) and then displays images corresponding to the content (S220).

For example, the portable terminal 120 may request the first content playback device 100 to transmit the content information, corresponding to the user's content input request, such that the first content playback device 100 may transmit the information on the content currently reproduced therein to the portable terminal 120.

In addition, the content information may include the mages corresponding to the content reproduced in the first content playback device 100. For example, the content images may be images being currently reproduced in the first content playback device 100.

Referring to FIG. 5b, the images reproduced in the first content playback device 100 may be displayed on a screen of the portable terminal 120 according to the user's content input request.

The portable terminal 120 may store the content information received from the first content playback device 100 (S230).

Then, when the portable terminal 120 is requested to output the content from the user (S240), the portable terminal 120 transmits the stored content information to the second content playback device 110, correspondingly (S250), and then ends the displaying of the images (S260).

For example, as shown in FIG. 6A, when the user requests to output the content displayed on the portable terminal 120, that is, the content reproduced in the first content playback device 100 to the second content playback device 110, the portable terminal 120 may transmit the stored content information to the second content playback device 110.

Meanwhile, as shown in FIG. 6B, according to the user's content output request, the content images displayed on the screen of the portable terminal 120 may be displayed on a screen of the second content playback device 110. At the same time, the displaying of the content images on the screen of the portable terminal 120 may end.

More specifically, the second content playback device 110 may extract the content images corresponding to the content information received from the portable terminal 120, that is, the content images displayed on the screen of the portable terminal 120 to display on the screen, and the content images displayed in the portable terminal 120 may disappear from the portable terminal 120 simultaneously with appearing in the second content playback device 120.

As described above, the content images currently displayed in the first content playback device 100 is displayed in the portable terminal 120 corresponding to the user's content input request and then is displayed so as to appear in the second content playback device 110 simultaneously with disappearing from the portable terminal 120, such that the user may rapidly and intuitively recognize selection or movement of the content to be shared using to portable terminal 120.

FIGS. 7A to 8C show another exemplary embodiments of the method for displaying the content images in the first and second content playback devices 100 and 110 and the portable terminal 120.

Referring to FIGS. 7A to 7C, in the case in which a user requests to input content reproduced in the first content playback device 100 using the portable terminal 120, images corresponding to the content gradually appears on the screen of the portable terminal 120. At the same time the content images displayed on the screen of the first content playback device 100 may gradually disappear.

That is, as shown in FIG. 7A, corresponding to the user's content input request, a portion of the content images displayed on the screen of the first content playback device 100 disappear. At the same time, the portion of the content images disappearing from the screen may appear on the screen of the portable terminal 120.

In addition, as shown in FIG. 7B, many portions of the content images displayed on the first content playback device 100 gradually disappear with the passage of time, and many portions of the content images may gradually appear on the screen of the portable terminal 120 accordingly.

After a predetermined time elapses, as shown in FIG. 7C, the content images displayed on the screen of the first content playback device 100 all disappears, and the entire content images may be displayed on the screen of the portable terminal 120.

As described above, the images of the same content is synchronized to thereby be displayed between the first content playback device and the portable terminal 120, thereby making it possible to provide a visual effect as if the content which the user is to share are actually moved from the first content playback device 100 to the portable terminal 120

Therefore, the user selects the content reproduced in the first content playback device 100 using the portable terminal 120 and may rapidly and intuitively recognize that the user may move the selected content to other device to share the moved content.

Referring to FIGS. 8A to 8C, in the case in which the user requests to output the content input in the portable terminal 120 to the second content playback device 110, the content images displayed on the screen of the portable terminal 120 is displayed so as to gradually disappear. At the same time the corresponding content images may gradually appear on the screen of the second content playback device 110.

That is, as shown in FIG. 8A, a portion of the content images displayed on the screen of the portable terminal 120 may disappear, corresponding to the user's content output request. At the same time the portion of the content images disappearing from the screen of the portable terminal 120 may appear on the screen of the second content playback device 110.

Further, as shown in FIG. 8B, many portions of the content images displayed on the screen of the portable terminal 120 gradually disappear with the passage of the time, and the many portions of the content images gradually appear on the screen of the second content playback device 110, accordingly.

After a predetermined time elapses, as shown in FIG. 8C, the content images displayed on the screen of the portable terminal 120 all disappears, and the entire content images may be displayed on the screen of the second content playback device 110.

As described above, the images of the same content is synchronized to thereby be displayed between the portable terminal 120 and the second playback device 110, thereby making it possible to provide a visual effect as if the content which the user is to share is actually moved from the portable terminal 120 to the second content playback device 110.

Therefore, the user may rapidly and intuitively recognize that the content stored in the portable terminal 120 is moved to the second content playback device 110 to be shared with the first content playback device 110.

As described above, the content images reproduced in the first content playback device 110 is displayed in the portable terminal 120 and then again is displayed in the second content playback device 110, such that the first and second content playback devices may share the corresponding content with each other.

According to the exemplary embodiment of the present invention, corresponding to the user's content input or output request, the portable terminal 120 may receive only information on the content, that is, without including the image and voice data of the corresponding content (hereinafter, referred to as 'content data') to transmit the received information to the second content playback device 110, and the content data may not pass through the portable terminal 120 but be directly transmitted from the first content playback device 100 to the second content playback device 110.

Figure 9:
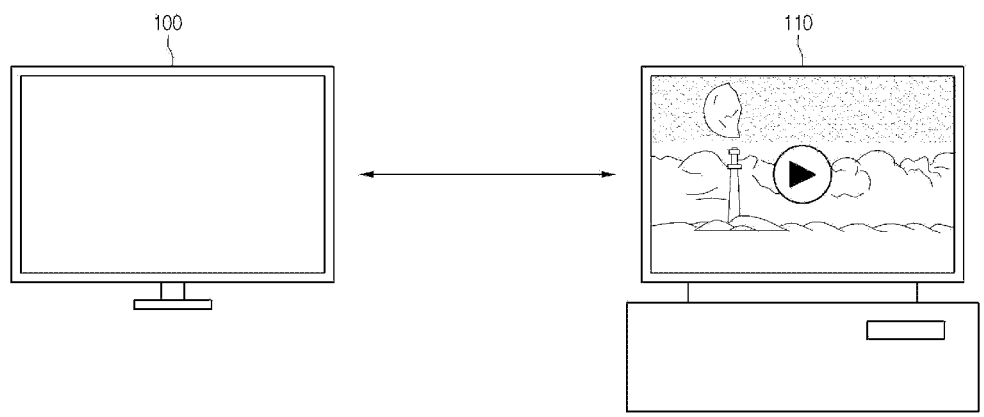
Figure 10:
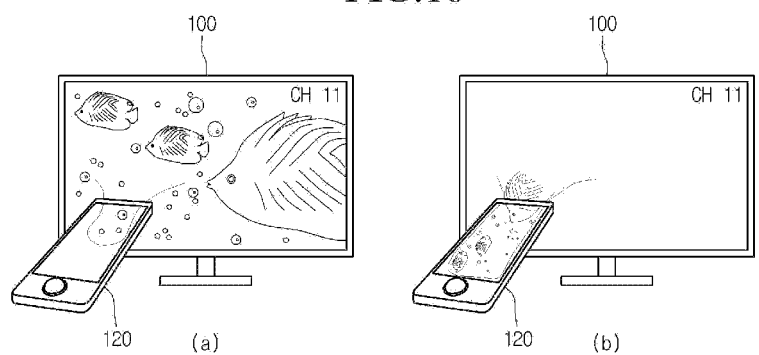
Figure 11:
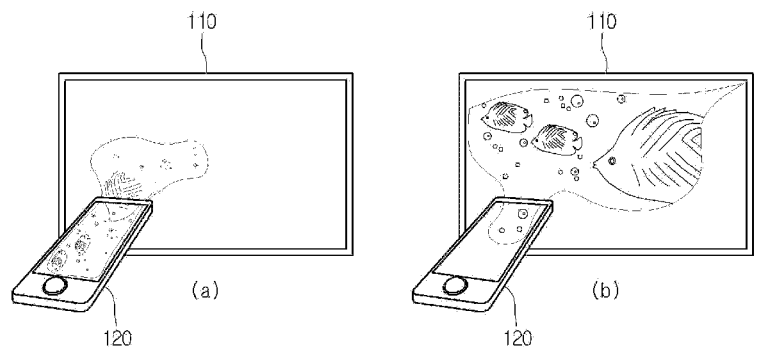

Referring to FIG. 9, the second content playback device 110 extracts identification information on the content and the first content playback device 100 from the content information received from the portable terminal 120 and is connected to the first content playback device 100 through a wired and wireless network using the extracted identification information, thereby make it possible to receive the content data.

As described above, the portable terminal 120 transmits and receives only the content information having a small data size without including the content data to transmit a visual effect that the corresponding content are input, stored, and output to the user and allows the content data having a large data size to be transmitted and received between the first and second content playback devices sharing the content, thereby make it possible to rapidly and easily control content-sharing.

Meanwhile, as shown in FIG. 9, in the case in which the user selects playback after the content images are displayed in the second content playback device 110, continuous playback according to the content-sharing may be performed in the second content playback device 110.

FIGS. 10A to 11B show another exemplary embodiments of the method for displaying the content images in the first and second content playback devices 100 and 110 and the portable terminal 120.

Referring to FIGS. 10A and 10B, in the case in which the user requests to input the content reproduced in the first content playback device 100 using the portable terminal 120, the content images displayed on the screen of the first content playback device 100 may be displayed so as to disappear while being reduced from the first content playback device 100 in one direction. At the same time the content images may be displayed so as to appear while being enlarged on the screen of the portable terminal 120 in one direction.

For example, corresponding to the user's content input request, each of the first content playback device 100 and the portable terminal 120 may display the content images using an animation having a visual effect as if liquid is discharged and sucked.

That is, as sequentially shown in FIGS. 10A and 10B, corresponding to the user's content input request, the content images displayed on the screen of the first content playback device 100 disappears while being reduced in one direction as the liquid is discharged, the content images appear while being gradually enlarged in one direction such as liquid is sucked.

Referring to FIGS. 11A and 11B, in the case in which the user requests to output the content input in the portable terminal 120, the content images displayed on the screen of the portable terminal 120 disappear while being reduced in one direction from the portable terminal 120. At the same time the content image may be displayed so as to appear while being enlarged on the screen of the second content playback device 110 in one direction.

For example, as sequentially shown in FIGS. 11A and 11B, corresponding to the user's content output request, the content images displayed on the screen of the portable terminal 120 disappear while being gradually reduced using an animation having a visual effect as if the liquid is discharged. At the same time, the content images may be displayed while being gradually enlarged using animation having a visual effect as if the liquid is sucked.

As described above with reference to FIGS. 10A to 11B, in a method for displaying content images may transfer an intuitive visual effect as if the portable terminal 120 sucks and stores the content reproduced in the first content playback device 100 to discharge the stored content to the second content playback device 110 to the user, similar to a pipette sucking and storing the liquid and then discharging the liquid.

In addition, corresponding to the user's content input request, during displaying while enlarging the content images in the portable terminal 120, the portable terminal may output a sound effect as if the liquid is sucked.

On the other hand, the portable terminal 120 may output a sound effect as if the liquid is discharged during a process in which the content images displayed in the portable terminal 120 disappear while being reduced, corresponding to the user's content output request.

Figure 12:
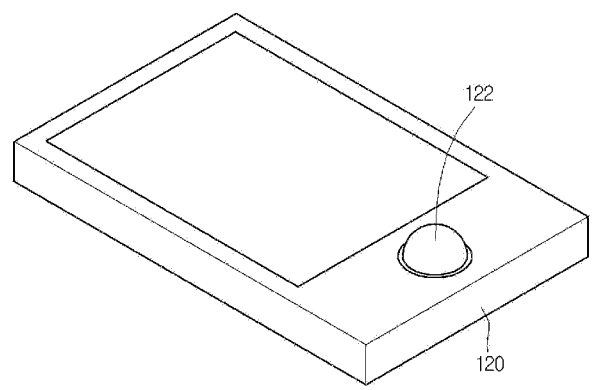
FIG. 12 is a perspective diagram showing an exemplary embodiment of a configuration of a user input button provided in a portable terminal.

FIG. 12 is a perspective diagram showing an embodiment of a configuration of a user input button provided in a portable terminal, and in a configuration and operations of the portable terminal shown in FIG. 12, a description of portions overlapped with portions described above with reference to FIGS. 1 to 11B will be omitted.

Referring to FIG. 12, the portable terminal 120 may provide a button 122 for receiving the user's content input and output requests.

For example, the button 122 of the portable terminal 120 may be made of a material having elasticity such as a rubber, or the like, to thereby be deformed by pressure applied from the user and recognize the user's content input and output requests due to the deformation.

More specifically, when the user applies the pressure to the button 122 and then relieves the applied pressure, the portable terminal 120 may recognized that the user's content input request is present.

On the other hand, when the user applies the pressure to the button 122 and presses the button 122, the portable terminal may recognize that the user's content output request is present.

The operation of the button as described above is similar to an operation of sucking the liquid by pressing a rubber pocket hung to one end of the pipette and again releasing the rubber pocket and discharging the sucked liquid by pressing the rubber pocket.

As described with reference to FIGS. 10A to 11B, the animation and the sound effect as if the liquid is sucked or discharged and the operation of the button described with reference to FIG. 12 are combined with each other, such that the user may visually, auditorily and tactily feel the operation of controlling content-sharing using the portable terminal 120 as if the liquid is sucked and discharged using the pipette.

Figure 13:
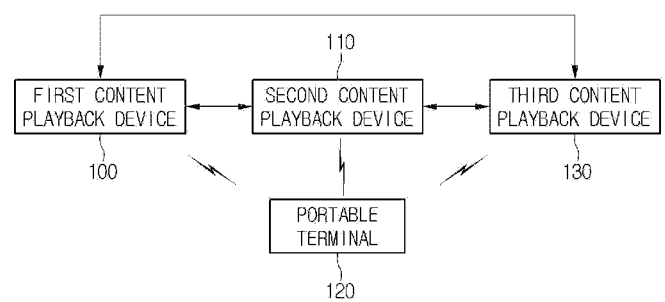
FIG. 13 is a block diagram showing a configuration of a content-sharing system according to a second exemplary embodiment of the present invention.

FIG. 13 a block diagram showing a configuration of a content-sharing system according to a second exemplary embodiment of the present invention, and in the configuration of the content-sharing system shown in FIG. 13, a description of portions overlapped with portions described above with reference to FIGS. 1 to 12 will be omitted.

Referring to FIG. 13, the portable terminal 120 may control content-sharing between the first to third content playback devices 100, 110 and 130 according to content input and output requests input by the user.

For example, the user inputs a first content stored or reproduced in the first content playback device 100 to the portable terminal 120 and inputs s second content stored or reproduced in the second content playback device 110 to the portable terminal 120, through the content input request as described with reference to FIGS. 4 to 12, and then may output the first and second contents from the portable terminal 120 to the third content playback device 130 through the content output request.

Therefore, the first content of the first content playback device and the second content of the second content playback device may be reproduced in the third content playback device 130 together with each other.

Figure 14:
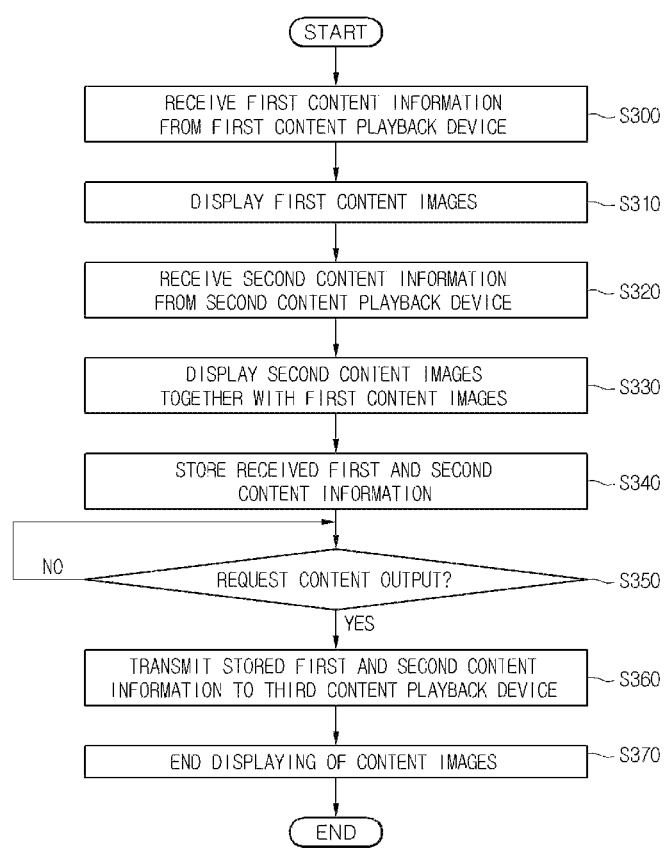
FIG. 14 is a flow chart showing a second exemplary embodiment of the method for controlling content-sharing according to the present invention.
Figure 15:
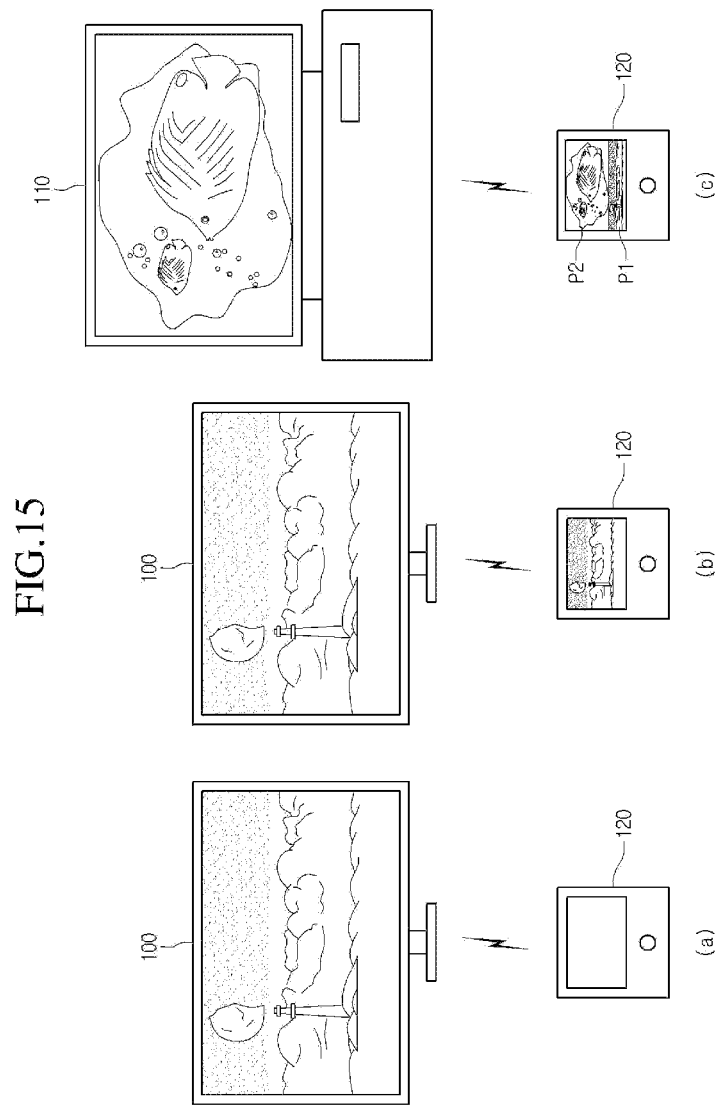
Figure 16:
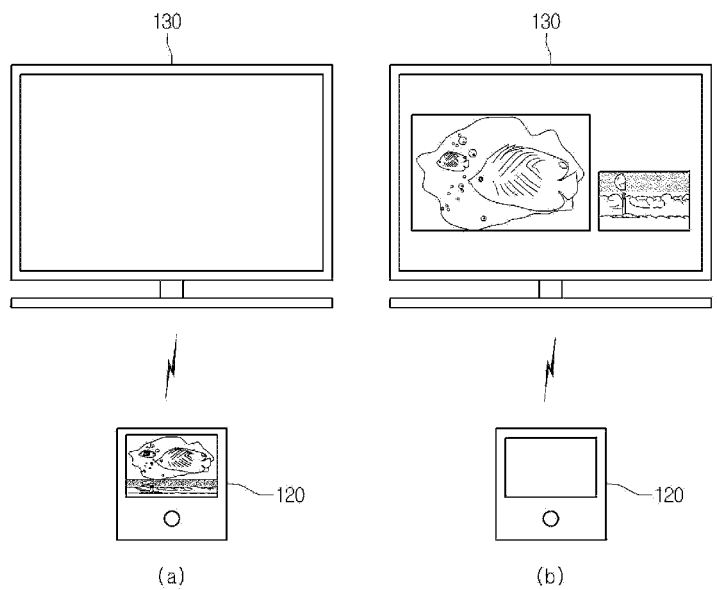

FIG. 14 is a flow chart showing a second exemplary embodiment of the method for controlling content-sharing according to the present invention.

Referring to FIG. 14, the portable terminal 120 receives first content information from the first content playback device 100 (S300) and displays images of the first content on the screen (S310).

Referring to FIGS. 15A and 15B, in the case in which the user requests to input the first content reproduced in the first content playback device using the portable terminal 120, the information on the first content may be transmitted to the portable terminal 120 and the images of the first content may be displayed on the screen of the portable terminal 120.

Next, the portable terminal 120 receives second content information from the second content playback device 110 (S320) and display images of the second content on the screen together with the first content images (S330).

Referring to FIG. 15C, in the case in which the user requests to input the second content reproduced in the second content playback device 110 in a state in which the first content images are displayed on the screen of the portable terminal 120, the information on the second content may be transmitted to the portable terminal 120, and the first and second content images P1 and P2 are displayed on the screen thereof together with each other.

For example, the first and second content images P1 and P2 are vertically disposed and displayed together with each other on the screen of the portable terminal 120, and more specifically, the first content images P1 of which the information is early received may be displayed at a lower portion and the second content images P2 of which the information is later received may be displayed at a upper portion.

In addition, sizes of the first and second content images P1 and P2 may be displayed to be in proportion to data sizes of the corresponding content, respectively. For example, in the case in which the second content has a data size larger than that of the first content, the second content images P2 are displayed to be larger than the first content images P1 on the screen of the portable terminal 120.

Meanwhile, the portable terminal 120 stores the first and second content information received from each of the first and second content playback devices 100 and 110 (S340).

Next, in the case in which the content output is requested from the user (S350), the portable terminal 120 transmits the stored first and second content information to the third content playback device 130 (S260) and ends displaying of the first and second content images (S370).

Referring to FIG. 16A, the user may request to output the first and second content to the third content playback device 130 using the portable terminal 120 in which the first and second content images P1 and P2 are displayed together with each other, such that the portable terminal 120 may transmit the first and second content information to the third content playback device 130.

In addition, corresponding to the user's content output request, as shown in FIG. 16B, the first and second content images are displayed in the third content playback device 130 together with each other. At the same time, the first and second images P1 and P2 displayed on the screen of the portable terminal 120 disappear.

The third content playback device 130 may receive the first and second content data from each of the first and second content playback devices 100 and 110. To this end, the third content playback device 130 may request each of the first and second content playback devices 100 and 110 to transmit the corresponding content using the received first and second content information.

Figure 17:
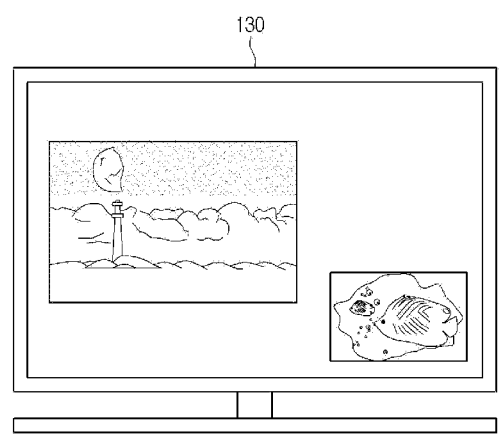

As shown in FIG. 17, sizes and positions at which the first and second contents are displayed in the third content playback device 130 may be changed.

For example, the user adjusts pressure applied to the button 122 of the portable terminal 120 or a time in which the button is pressed as shown in FIG. 12, thereby making it possible to set a size at which the contents are reproduced on the screen of the third content playback device 130.

More specifically, the larger the strength or the time at which the user presses the button 122 of the portable terminal 120, the larger the size of the corresponding content reproduced on the screen.

Meanwhile, the user adjusts a direction in which the portable terminal 120 faces, thereby making it possible to set a position at which the content is reproduced on the screen of the third content playback device 130.

As described above, the contents transmitted from each of the first and second content playback devices 100 and 110 may be various contents s968574 a cinema, a music, a document file, a photograph, a real time broadcasting, news, and the like.

Referring to FIGS. 18 A to 18C, the user may input a photograph content and a music content from the first and second content playback devices 100 and 110 to the portable terminal 120 and then output two contents to the third content playback device 130 to reproduce the two contents together with each other.

The third content playback device 130 may synthesize the photograph and the music to reproduce it, thereby making it possible to outputting the music that was reproduced in the second content playback device 110 as a background music simultaneously with reproducing the photograph that was reproduced in the first content playback device 100.

FIG. 19 is a flow chart showing a third exemplary embodiment of the method for controlling content-sharing according to the present invention, and in the method for controlling content-sharing shown in FIG. 19, a description of the portions overlapped with portions described above with reference to FIGS. 1 to 18 will be omitted.

Referring to FIG. 19, the portable terminal 120 sequentially receives information on first and second contents to be shared (S400) and disposes and displays images of the first and second contents according to an information reception sequence (S410).

For example, a plurality of contents input to the portable terminal 120 may be sequentially displayed upwardly from a lower portion of the screen according to the sequence in which the content information is received.

As shown in FIGS. 20A and 20B, images P1 of the first content of which the information is early received may be displayed on a lower portion of the screen of the portable terminal 120, and images P2 of the second content of which the information is later received may be displayed over the first content images P1.

Then, in the case in which the content output request from the user is present, (S420), the portable terminal 120 transmits the first and second content information in a sequence reverse to the information reception sequence (S430)

For example, in the case in which the plurality of content images are sequentially displayed upwardly on the lower portion of the screen according to the content information reception sequence as described above, whenever the user's content output request is present, the corresponding content information may be sequentially transmitted from the content displayed on the uppermost portion, which is the reverse sequence to the information reception sequence.

As shown in FIG. 20C, in the case in which the user's content output request is present, the images P2 of the second content of which the information is later received disappear from the screen and at the same time the second content information is transmitted, such that the second content may be outputted from the portable terminal 120 to a receiving side content playback device.

Next, in the case in which the user again request to output the content, the images P1of the first content of which the information is early received disappear from the screen and at the same time, the first content information is transmitted, such that the first content may be outputted from the portable terminal 120 to the receiving side content playback device as shown in FIG. 20D.

Figure 21:
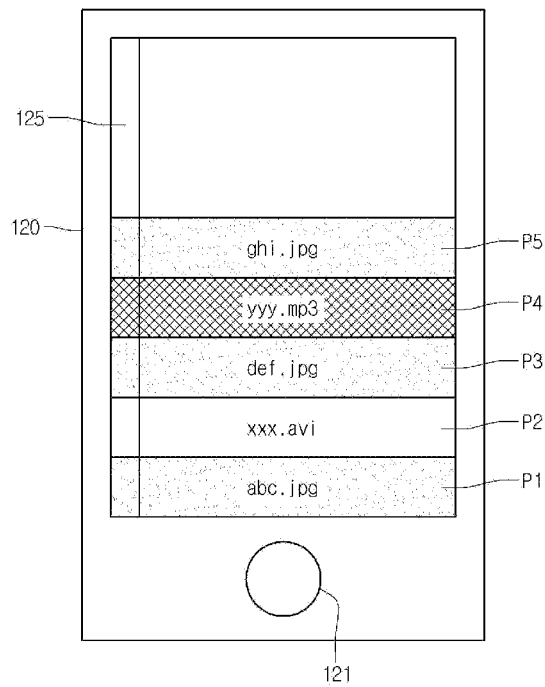

FIG. 21 is a diagram showing a method for displaying a plurality of content images on the screen of the portable terminal 120.

Referring to FIG. 21, the portable terminal 120 may receive information on a plurality of contents to be shared from one or more content playback devices to display a plurality of content images P1 to P5 on the screen together with each other.

The plurality of content images P1 to P5 may be sequentially stacked upwardly at a lower portion of the screen in a sequence from the first content to the fifth content, which is a content information reception sequence, to thereby be displayed.

Meanwhile, the plurality of content images P1 to P5 may be distinguished from each other using colors, texts, or sizes to thereby be displayed.

For example, the plurality of content images P1 to P5 may be displayed by different colors according to a kind of corresponding contents, and more specifically, be displayed by each corresponding colors according to the kind of contents, such as a cinema, a photograph, a music, a document file, a real time broadcasting, a game, and the like. In addition, the kind of contents may be distinguished according to a file extension of the corresponding content.

Referring to FIG. 21, among the plurality of content images P1 to P5, the content images P1, P3 and P5 corresponding to first, third, and fifth contents, which are photograph files may be displayed by the same color, for example a red color.

Meanwhile, the images P2 of the second content, that is a cinema file, may be displayed by a different color from the photograph content, for example, a blue color and the images P4 of the fourth content, that is a music file, may be displayed by a different color from the photograph content and the cinema content, for example, a yellow color.

Further, the plurality of content images P1 to P5 may include a name of the corresponding content, for example a file name of the corresponding content may be displayed together with the images as shown in FIG. 21.

The plurality of content images P1 to P3 may be displayed to have different sizes according to a data size of the corresponding content. For example, as the data size of the corresponding content is increased, the size of the content images may be increased in proportion thereto.

According to the exemplary embodiment of the present invention, the portable terminal 120 may display the data sizes of each of the contents input from the content playback devices together with the a total storage capacity.

Referring to FIG. 21, a bar 125 for indicating a data size may be displayed on one side of the screen of the portable terminal 120, and a total length of the bar 125 may indicates the total storage capacity of the portable terminal 120.

Meanwhile, the bar 125 displayed in the portable terminal 120 may indicate the data sizes of the plurality of corresponding contents using the plurality of contents images P1 to P5, respectively.

The above-mentioned bar 125 displayed in the portable terminal 120 may perform the same role as a scale marked on a glass tube of a pipette.

When the user requests to output the content in the state in which the plurality of content images P1 to P5 are displayed, the contents may be sequentially output from the first content displayed at the uppermost portion in the sequence reverse to the content information reception sequence.

Figure 22:
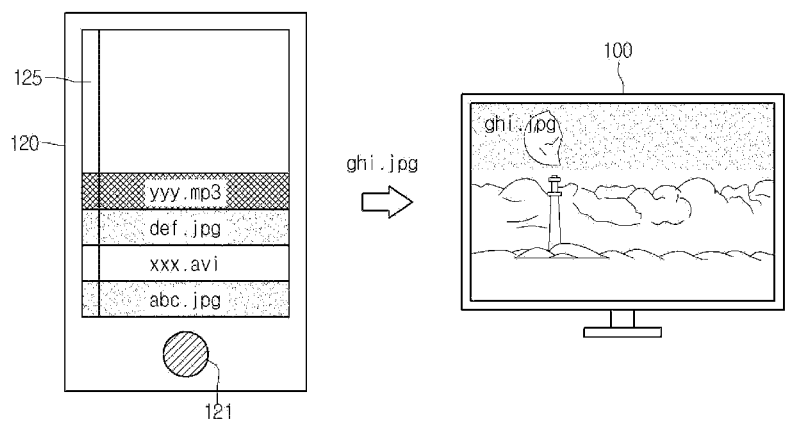
Figure 23:
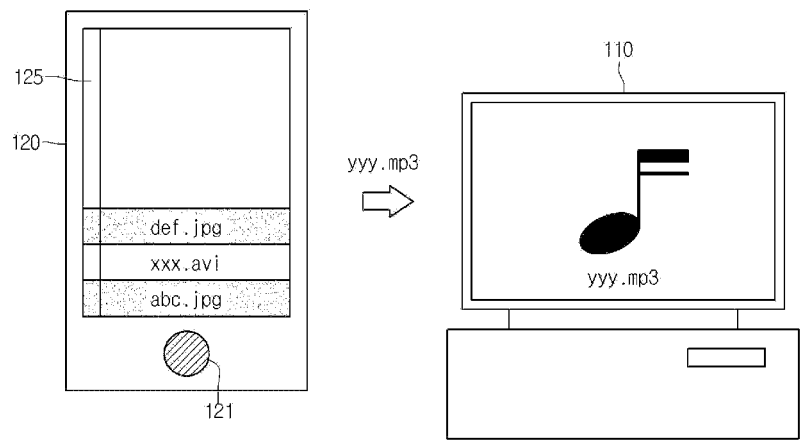
Figure 24:
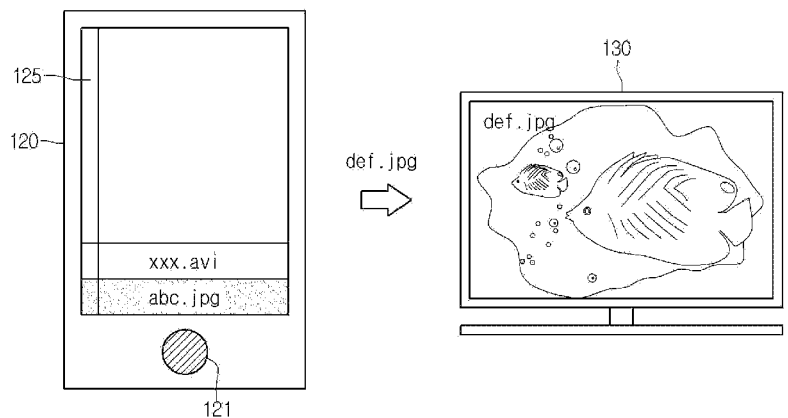

Referring to FIG. 22, in the case in which the user requests to output the first content to the first content playback device 100 using the portable terminal 120, a "ghi.jpg" photograph corresponding to the fifth content images P5 displayed at the uppermost portion of the plurality of content images P1 to P5 may be output to the first content playback device 100.

Next, in the case in which the user requests to output the second content to the second content playback device 110, a "yyy.mp3" music corresponding to the fourth content images P4 displayed at the uppermost portion of a plurality of content images P1 to P4 displayed on the portable terminal 120 may be output to the second content playback device 110.

In addition, in the case in which the user requests to output the third content to the third content playback device 130, a "def.jpg" photograph corresponding to the third content images P3 displayed at the uppermost portion of a plurality of content images P1 to P3 displayed on the portable terminal 120 may be output to the third content playback device 130.

As described above, according to the user's content output request, the contents may be sequentially output from the portable terminal 120 in a sequence of the fifth content, the fourth content, the third content, the second content, and the first content, which is a sequence opposite to the sequence in which the content information is received.

According to another exemplary embodiment of the present invention, the portable terminal 120 may be receive a user's mixing request for the content images displayed therein, thereby make it possible to distinguish the plurality of contents images according to the kind of corresponding content to display them.

Figure 25:
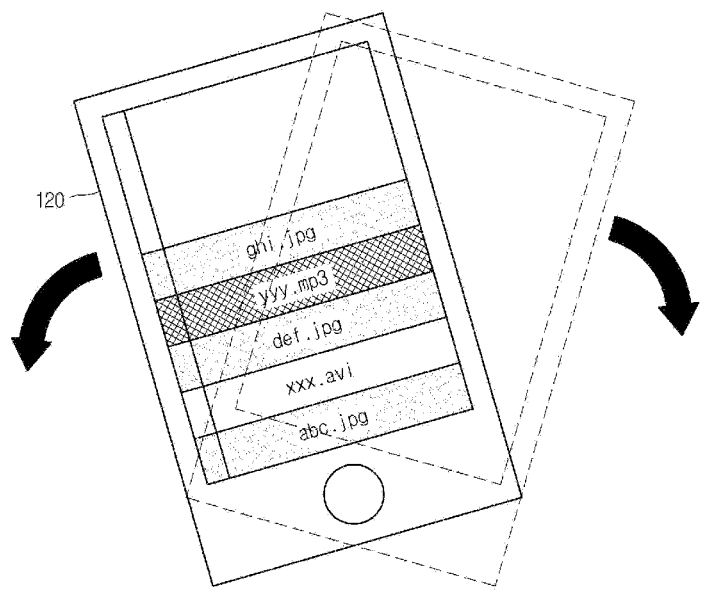

As shown in FIG. 25, the user may shake the portable terminal 120 horizontally to request the above-mentioned mixing, the portable terminal 120 may include a motion sensor such as a gyro sensor, or the like, in order to sense motion of the user as describe above.

Meanwhile, in the case in which the user shakes the portable terminal 120 horizontally to requests the mixing, the plurality of content images P1 to P5 may be displayed on the screen of the portable terminal 120 in a state in which the images corresponding to same kind of contents is merged with each other.

Figure 26:
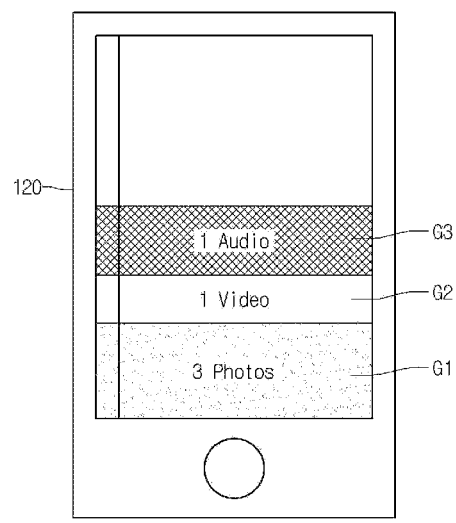

Referring to FIG. 26, among the plurality of content images P1 to P5, three content images correspond to an "abc.jpg", the "def.jpg", and the "ghi.jpg", which are photograph contents, may be merged into a first group G1 to thereby be displayed.

Figure 27:
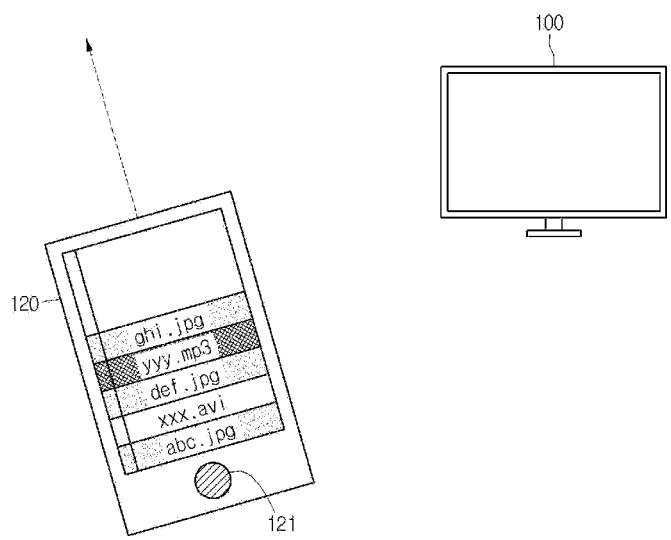
FIGS. 27 to 29 are diagrams showing exemplary embodiments of a method for managing information on the plurality of contents.
Figure 28:
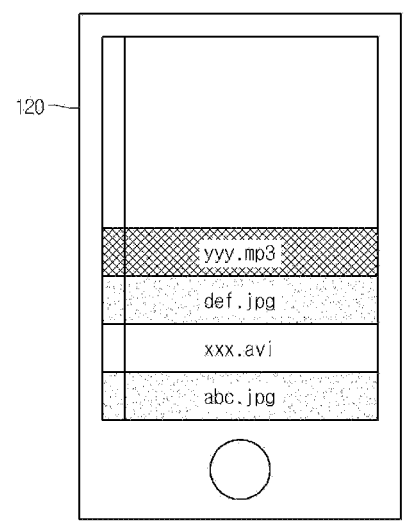
Figure 29:
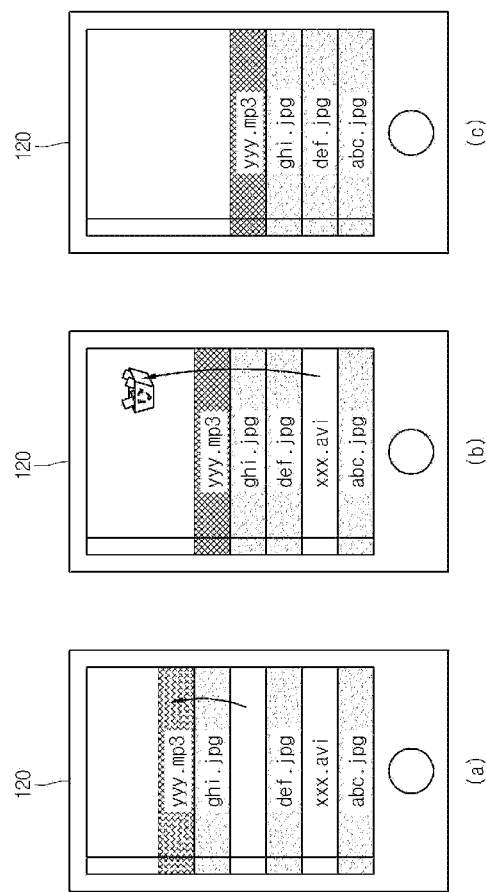

FIGS. 27 to 29 are diagrams showing exemplary embodiments of a method for managing information on the plurality of contents.

Referring to FIG. 27, in the case in which the user's content output request is present in a state in which the portable terminal 120 dose not face the content playback device, the stored content information may be deleted.

For example, in the case in which the user allows the portable terminal 120 to face a direction in which the content playback device 100 is not present and then press the content output button, as shown in FIG. 28, the "ghi.jpg" images of the uppermost portion of the plurality of content images displayed on the screen disappear, and the corresponding content information may be deleted in the portable terminal 120.

Referring to FIGS. 29A to 29C, the user may drag and drop the content images displayed in the portable terminal 120 to manage information on the plurality of contents.

Referring to FIG. 29A, the user drags the "YYY.mp3" content images displayed in the portable terminal 120 and then drops the dragged images at a desired position, thereby making it possible to change the position at which the "yyy.mp3" content images are displayed. Therefore, an output sequence of the "yyy.mp3" content may be changed.

That is, as shown in FIG. 29B, the "yyy.mp3" content images are displayed at the uppermost portion by the user's drag and drop operations, such that the "yyy.mp3" content may be first output to the content playback device at the time of the user's content output request.

Meanwhile, the user drags and drops the images displayed in the portable terminal 120 to a specific position, thereby making it possible to delete the content corresponding to the dragged images.

That is, as shown in FIG. 29B, the user drags a "xxx.avi" content images and then drops the dragged images to a position at which a "recycle bin" is displayed, thereby making it possible to delete the "xxx.avi" content.

Therefore, as shown in FIG. 29C, the "xxx.avi" content images dropped to the position at which the "recycle bin" is displayed disappears among the plurality of content images, and the corresponding content information may be deleted in the portable terminal 120.

In addition, the method for controlling content-sharing according to the exemplary embodiment of the present invention as described above may be implemented by a program to be executed in a computer to thereby be stored in a computer readable recoding medium. An example of the computer readable recoding medium includes a ROM, a RAM, a CD-ROM, a magnetic tape, a floppy disk, an optical data storage device, and the like, and the recoding medium may be implemented in a form of a carrier wave form (for example, transmission through the internet).

The computer readable recoding medium may be distributed in a computer system connected by a network, such that computer readable codes may be stored and executed in a distributed scheme. In addition, functional programs, Codes, and code segments in order to implement the controlling method may be easily deduced by programmers in the art to which the present invention pertains.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

The invention claimed is:

1. An operation method of a portable terminal for controlling content-sharing between a first content playback device and a second content playback device, wherein the first content playback device and the second content playback device are connected to each other to transmit data to each other, the method comprising:
   receiving a first input on the portable terminal, to receive information on a content reproduced or stored in a first content playback device;
   in response to receiving the first input on the portable terminal, receiving the information on the content from the first content playback device, wherein the information on the content comprises an image corresponding to the content reproduced or stored in the first content playback device;
   displaying, by the portable terminal, the image corresponding to the content, in accordance with the received information on the content from the first playback device;
   receiving a second input on the portable terminal, to reproduce the content on the second content playback device;
   in response to receiving the second input, ending the displaying of the image on the portable terminal corresponding to the content;
   transmitting, by the portable terminal the information on the content to the second content playback device, to reproduce the content reproduced or stored in the first content playback device, in the second content playback device,
   transmitting, by the second content playback device, a request to receive the content to the first content playback device using the information on the content, in response to receiving the information on the content from the portable terminal;
   transmitting, by the first content playback device, the content to the second content playback device without passing through the portable terminal, in response to receiving the request; and
   displaying, by the second content playback device, the transmitted content from the first content playback device.

2. The method according to claim 1, wherein the displaying the image corresponding to the content on the portable terminal comprises displaying the image corresponding to the content so as to appear while being enlarged in one direction.

3. The method according to claim 2, further comprising:
   displaying the image corresponding to the content in the first content playback device so as to gradually disappear during the gradual appearance of the image corresponding to the content displayed on a display screen of the portable terminal.

4. The method according to claim 1, further comprising:
   displaying the image corresponding to the content initially on a position of the second content playback device, in accordance with the direction of the second input.

5. The method according to claim 4, wherein the image corresponding to the content is displayed on the second content playback device so as to gradually appear on the second content playback device during the gradual disappearance of the image corresponding to the content displayed on a display screen of the portable terminal.

6. The method according to claim 1, wherein the ending the displaying of the image corresponding to the content of the portable terminal comprises displaying the image corresponding to the content so as to gradually disappear from the portable terminal while being reduced in one direction.

7. The method according to claim 1 further comprising:
   storing the received information on the content in the portable terminal before receiving the second input.

8. The method according to claim 7, further comprising:
   receiving a third input on the portable terminal directing the portable terminal to a direction not facing the first content playback device or the second content playback device; and
   deleting the stored information on the content from the portable terminal in response to the third input.

9. The method according to claim 1,
wherein the information on the content comprises information on a plurality of contents,
wherein the receiving the information on the content comprises receiving the information on the plurality of contents sequentially,
wherein the displaying of images corresponding to the content comprises displaying images corresponding to the plurality of contents according to the images corresponding to the plurality of contents reception sequence, and
wherein the transmitting the received information on the content comprises transmitting the images corresponding to the plurality of contents in a sequence reverse to the contents reception sequence.

10. The method according to claim 9,
wherein the displaying the images corresponding to the plurality of contents comprises displaying the images corresponding to the plurality of contents from a lower portion toward an upper portion according to the images corresponding to the plurality of contents reception sequence, and
wherein the transmitting the images corresponding to the plurality of contents comprises transmitting from an uppermost displayed image to a lowermost displayed image among the displayed images corresponding to the plurality of contents.

11. A portable terminal for controlling content-sharing between a first content playback device and a second content playback device, wherein the first content playback device and the second content playback device are connected to each other to transmit data to each other, the portable terminal comprising:
a display screen; and
at least one processor configured to:
receive a first input on the portable terminal to receive an information on a content reproduced or stored in the first content playback device,
in response to receiving the first input on the portable terminal, receive the information on the content from the first content playback device, wherein the information on the content comprises an image corresponding to the content reproduced or stored in the first content playback device,
display, by the portable terminal, the image corresponding to the content, in accordance with the received information on the content from the first playback device,
receive a second input on the portable terminal to reproduce the content on the second content playback device,
in response to receiving the second input, end the displaying of the image on the portable terminal corresponding to the content,
transmit, by the portable terminal, the information on the content to the second content playback device, to reproduce the content reproduced or stored in the first content playback device, in the second content playback device,
transmit, by the second content playback device, a request to receive the content to the first content playback device using the information on the content, in response to receiving the information on the content from the portable terminal,
transmit, by the first content playback device, the content to the second content playback device without passing through the portable terminal, in response to receiving the request, and
display, by the second content playback device, the transmitted content from the first content playback device.

12. The portable terminal according to claim 11, wherein the at least one processor is further configured to display the image corresponding to the content on the portable terminal so as to gradually appear or disappear from the display screen of the portable terminal.

13. The portable terminal according to claim 11,
the portable terminal further comprising:
an input receiver including a button made of an elastic material,
wherein the input receiver is deformed by pressure applied, and to recognize the first input in accordance with a first pressure applied to the button being released and to recognize the second input in accordance with a second pressure being applied to the button.

14. The portable terminal according to claim 13, wherein a size of the image corresponding to the content displayed in the second content playback device is set to be in proportion to at least one of a range and a magnitude of the pressure applied to the button.

15. The portable terminal according to claim 11, wherein the portable terminal device is a remote controller for controlling operations of the first and second content playback devices.

* * * * *